United States Patent [19]
Ogita

[11] Patent Number: 5,054,460
[45] Date of Patent: Oct. 8, 1991

[54] EXHAUST GAS RECIRCULATION SYSTEM
[75] Inventor: Tamotu Ogita, Susono, Japan
[73] Assignee: Toyota Jidosha Kabushiki Kaisha, Aichi, Japan
[21] Appl. No.: 634,007
[22] Filed: Dec. 26, 1990
[30] Foreign Application Priority Data
 Dec. 28, 1989 [JP] Japan .................................. 1-338540
[51] Int. Cl.$^5$ ............................................ F02M 25/07
[52] U.S. Cl. ................................................... 123/571
[58] Field of Search ............... 123/1 A, 425, 478, 494, 123/568, 569, 571

[56] References Cited
U.S. PATENT DOCUMENTS

| | | | |
|---|---|---|---|
| 4,056,083 | 11/1977 | Wakita | 123/571 X |
| 4,139,151 | 2/1979 | Thornburgh | 123/571 X |
| 4,304,210 | 12/1981 | Hayakawa | 123/571 |
| 4,393,840 | 7/1983 | Tanaka et al. | 123/571 X |
| 4,462,377 | 7/1984 | Tanaka et al. | 123/569 X |
| 4,474,008 | 10/1984 | Sakurai et al. | 123/571 X |
| 4,485,794 | 12/1984 | Kimberley et al. | 123/569 |
| 4,594,993 | 6/1986 | Engel et al. | 123/571 |
| 4,770,148 | 9/1988 | Hibino et al. | 123/571 X |
| 4,909,225 | 3/1990 | Gonze et al. | 123/1 A X |

FOREIGN PATENT DOCUMENTS

| | | | |
|---|---|---|---|
| 0058921 | 3/1974 | Japan . | |
| 0129527 | 11/1976 | Japan . | |
| 0008413 | 1/1985 | Japan | 123/571 |
| 0088218 | 4/1988 | Japan | 123/425 |
| 0060768 | 3/1989 | Japan . | |

Primary Examiner—Willis R. Wolfe
Attorney, Agent, or Firm—Kenyon & Kenyon

[57] ABSTRACT

An exhaust gas recirculation system which comprises a passage provided between an exhaust passage of an internal combustion engine and an intake passage thereof, a valve provided at an intermediate portion of the passage for regulating a flow of an exhaust gas recirculated through the passage, a fuel distillation part for sensing a fuel distillation characteristic of a fuel within a fuel tank, an engine temperature part for sensing an engine temperature of the internal combustion engine, a first valve control part, and a second valve control part. The first valve control part generates a reference value at which the valve is turned ON allowing the exhaust gas recirculation to the intake passage, the reference value being varied to a first level when the fuel is a heavy type fuel and varied to a second level when the fuel is a light type fuel, the first level being higher than the second level. The second valve control part compares the engine temperature with the reference value, so that the valve is turned off stopping the exhaust gas recirculation while the engine temperature is not higher than the reference value, and the valve is turned on allowing the exhaust gas to be recirculated to the intake passage after the engine temperature exceeds the reference value. It is possible to vary the reference value in accordance with the fuel distillation characteristic of the fuel used, preventing driveability from worsening and properly reducing the amount of nitrogen oxide in the exhaust gas.

8 Claims, 10 Drawing Sheets

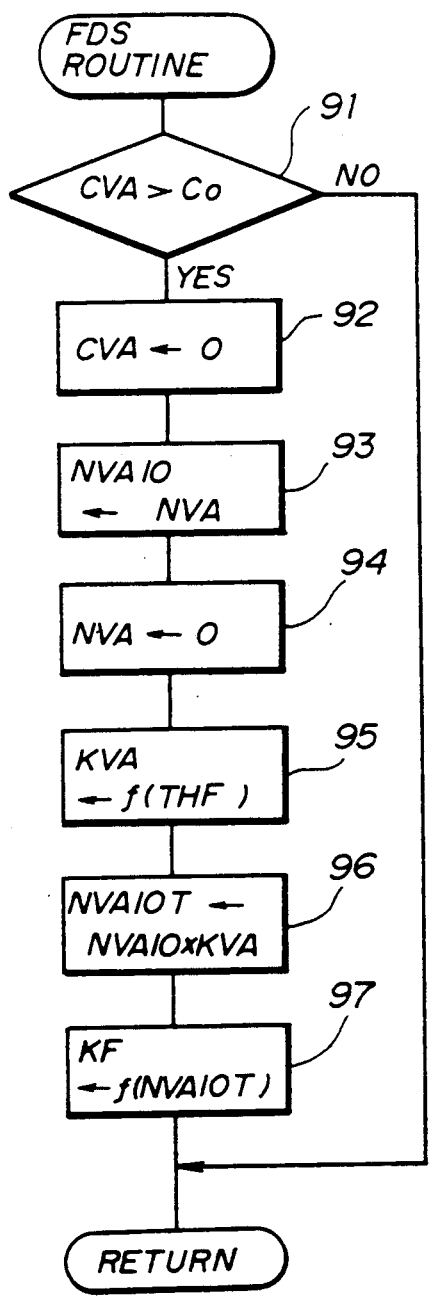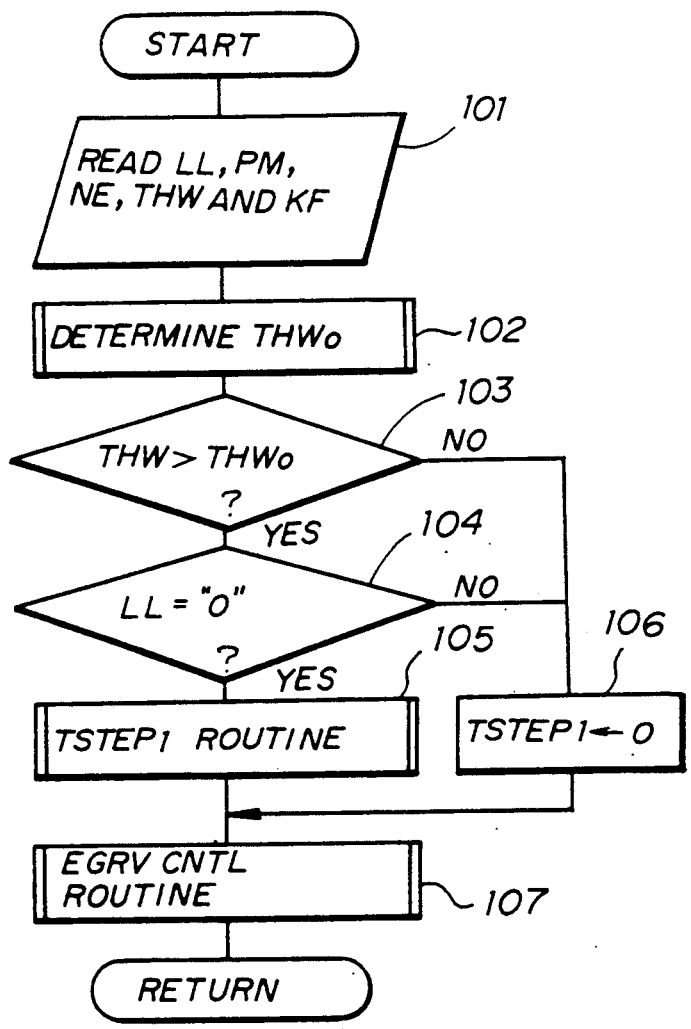

FIG. 6
FIG. 7
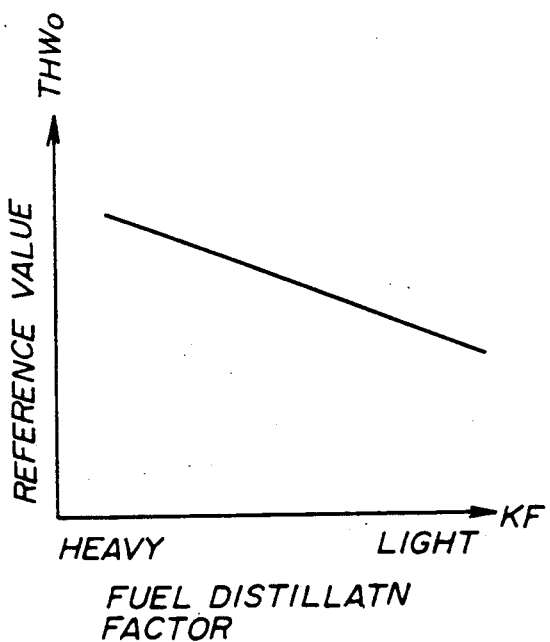
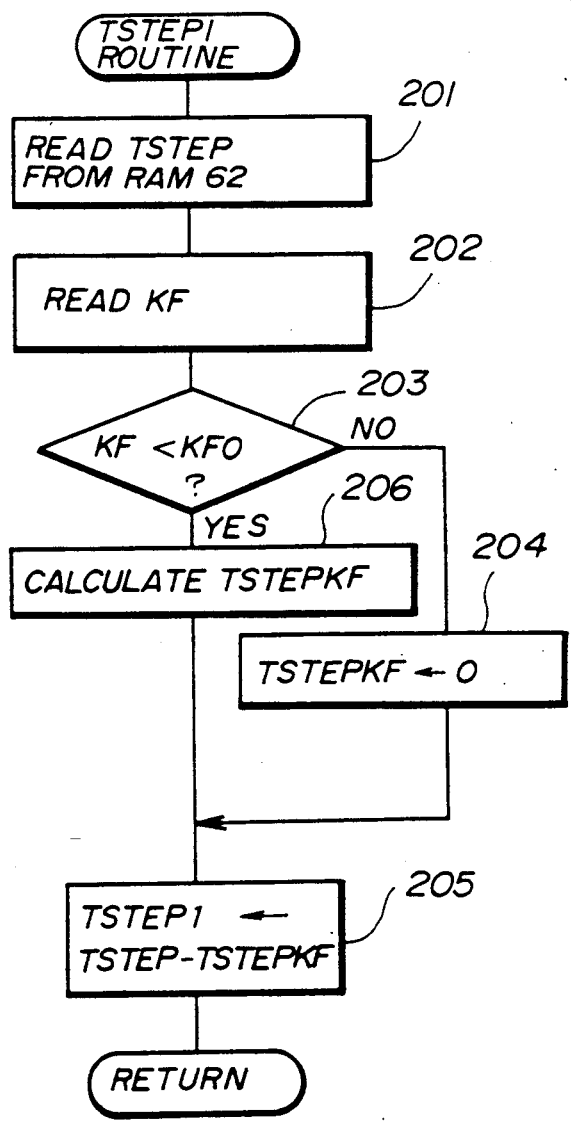

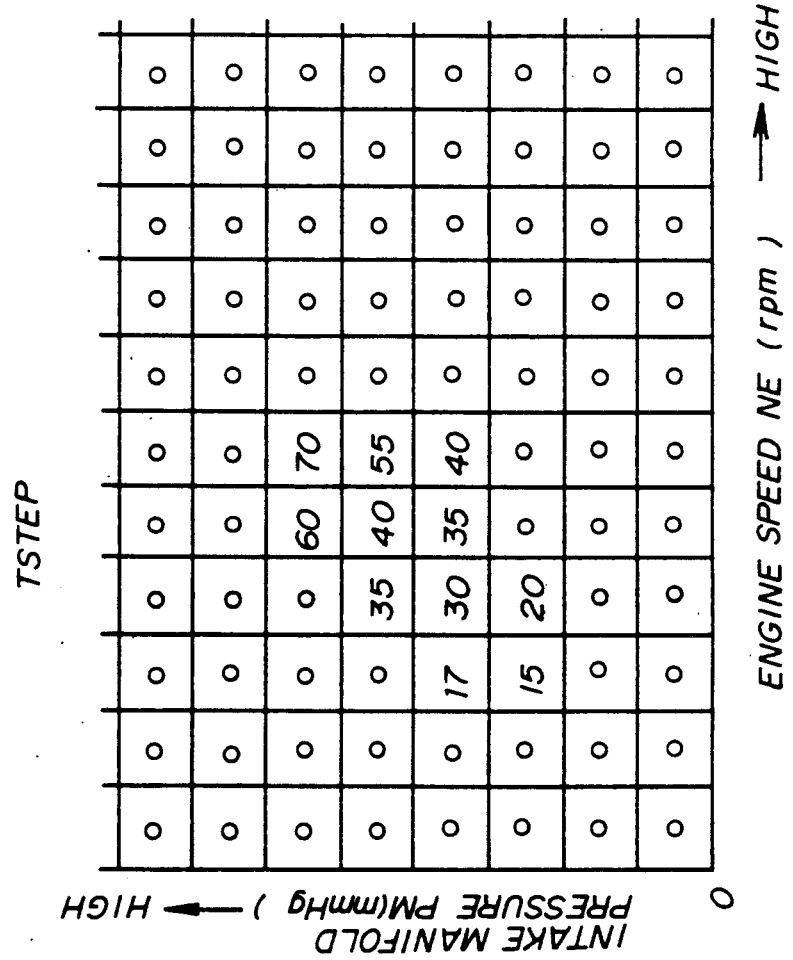

EXHAUST GAS RECIRCULATION SYSTEM

BACKGROUND OF THE INVENTION (1) Field of the Invention

The present invention generally relates to exhaust gas recirculation systems, and more particularly to an exhaust gas recirculation system for internal combustion engine which recirculates a small amount of exhaust gas into air/fuel mixture for slowing combustion speed in each combustion chamber of engine cylinders and lowering the peak combustion chamber temperature so that the amount of nitrogen oxide (NOx) included in the exhaust gas is reduced.

(2) Description of the Related Art

Conventionally, an exhaust gas recirculation system is used with an internal combustion engine, especially a gasoline engine for automobile vehicle employing gasoline fuel, for reducing the amount of nitrogen oxide (NOx) included in exhaust gas from the internal combustion engine. In general, the exhaust gas from the internal combustion engine contains several kinds of harmful gas including carbon monoxide (CO), hydrocarbon (HC) and nitrogen oxide (NOx). By using the exhaust gas recirculation system, it is possible to inject a small amount of the exhaust gas into the intake air/fuel mixture so that inert gas included in the exhaust gas absorbs a part of thermal energy generated owing to combustion in each of engine cylinders, thereby lowering the peak combustion chamber temperature in each engine cylinder and reducing the amount of nitrogen oxide (NOx) included in the exhaust gas. Such a function being achieved by the exhaust gas recirculation system is hereinafter called an exhaust gas recirculation.

However, there is a problem in that an excessive amount of exhaust gas being recirculated to the air/fuel mixture in the intake system results in an unfavorable decrease in the output power of the internal combustion chamber and an unstable combustion in each combustion chamber of engine cylinders, which will cause poor driveability and undesired increase in the amount of hydrocarbon (HC) included in the resultant exhaust gas. To eliminate such a problem, it is necessary to suitably control the quantity of exhaust gas recirculated to air/fuel mixture in an intake system in accordance with a driving condition of the internal combustion engine. The quantity of the recirculated exhaust gas is hereinafter called an EGR quantity. For this reason, there is a conventional exhaust gas recirculation system in which the exhaust gas recirculation is stopped to promote an engine idling for an increased engine temperature, when fuel is poorly evaporated at an engine temperature that is lower than a prescribed reference value of engine temperature, thereby stabilizing the driving condition of the engine. Such a conventional exhaust gas recirculation system is disclosed, for example, in Japanese Laid-Open Patent Application No. 51-129527 and in Japanese Laid-Open Utility Model Application No. 49-58921.

In general, fuel which is commercially available, for use in an internal combustion engine, especially in an automobile gasoline engine, may be classified by the distillation characteristic into several different types, for example, a light type fuel, a heavy type fuel and an ordinary fuel. A fuel of the type suitable for practical use is selected for individual internal combustion engines. In the following description, therefore, consider a criterion for the classification of fuel into such different types depending on whether more than 50% of the fuel evaporates at 100 deg. C. In such a case, the light type fuel is in conformity with this criterion and the heavy type fuel is not in conformity with this criterion. The light type fuel generally contains many parts having a low boiling point below 100 deg. C, while the heavy type fuel contains many components having a high boiling point above 100 deg C. Especially in a case of an automobile gasoline engine, several different types of fuel having different distillation characteristics may be used for the automobile gasoline engine. This is, the light type fuel sometimes may be used and the heavy type fuel in the other times may be used. Accordingly, the amount of the fuel in a liquid state sticking to an intake manifold wall and flowing without being evaporated into vapor in the case of the heavy type fuel is greater than that in the case of the light type fuel. The heavy type fuel does not easily evaporate when compared with the case of the light type fuel, and there is a greater part of the heavy type fuel sticking to an inside wall of an engine intake port in a liquid state, and the amount of such fuel liquid is greater than that in the case of the light type fuel.

The amount of fuel vapor which actually enters a combustion chamber of the internal combustion engine is equal to the amount of fuel vapor injected by the fuel injection valve to the combustion chamber from which the amount of fuel sticking to the inside wall of an intake port in a liquid state is subtracted. The amount of the fuel sticking to the inside wall of the intake manifold in a liquid state is highly unstable. As described above, the heavy type fuel includes such a kind of fuel parts in a greater percentage. In a case of the heavy type fuel, therefore, the composition of the fuel is varied greatly for each cycle of engine operation, and the fuel does not enter the combustion chamber of the internal combustion engine in a constant amount for the cycles of engine operation, thereby causing an undesired variation of air/fuel ratio within the combustion chamber and an instability of engine operation which are more appreciable in a case where the light type fuel is used. Therefore, when the heavy type fuel is used, it is necessary to set the reference value of engine temperature, at which the exhaust gas recirculation is stopped, to a higher level. In the meantime, when the light type fuel is used, the light type fuel easily evaporates and the engine operates in a relatively stable condition. Therefore, when the light type fuel is used, it is desired to set the reference value of engine temperature at which the exhaust gas recirculation is stopped, to a lower level, so that the amount of nitrogen oxide (NOx) included in the exhaust gas is reduced by the exhaust gas recirculation.

However, in a conventional exhaust gas recirculation (EGR) system, the reference value of engine temperature at which the exhaust gas recirculation is stopped is preset to a fixed value, regardless of what type of fuel is being used with the internal combustion engine. Therefore, in a case where the reference value of engine temperature is preset to a level that is suitable for use of the light type fuel, a poor driveability is often caused when the heavy type fuel is used with the internal combustion engine. On the other hand, in a case where the reference value of engine temperature is preset to a different fixed level that is suitable for using the heavy type fuel, reduction of the amount of nitrogen oxide (NOx) in the exhaust gas by the exhaust gas recirculation is unfavorably performed when the light type fuel is used with the internal combustion engine.

SUMMARY OF THE INVENTION

Accordingly, it is a general object of the present invention to provide an improved exhaust gas recirculation system in which the above described problems are eliminated.

Another and more specific object of the present invention is to provide an exhaust gas recirculation system which comprises a recirculation passage provided between an exhaust passage of an internal combustion engine and an intake passage thereof, a valve provided at an intermediate portion of the recirculation passage for regulating a flow of an exhaust gas from the exhaust passage to the intake passage through the recirculation passage, an engine temperature part for sensing an engine temperature of the internal combustion engine, a fuel distillation part for sensing a fuel distillation characteristic of a fuel within a fuel tank, a first valve control part, responsive to a first signal indicative of the fuel distillation characteristic supplied from the fuel distillation part, for generating a reference value of the engine temperature at which the valve is turned ON allowing the exhaust gas to be recirculated through the recirculation passage to the intake passage, the reference value being varied to a first level when the fuel is a heavy type fuel having a relatively small fuel distillation factor and the reference value being varied to a second level when the fuel is a light type fuel having a relatively great fuel distillation factor, the first level of the reference value being higher than the second level, and a second valve control part, responsive to a second signal supplied from the first valve control part, for comparing the engine temperature from the engine temperature part with the reference value from the first valve control part, so that the valve is placed at a closed position stopping the flow of the exhaust gas through the recirculation passage to the intake passage when the engine temperature is not higher than the reference value, and after the engine temperature is raised to exceed the reference value the valve is placed at an open position allowing the exhaust gas to be recirculated through the recirculation passage to the intake passage. According to the present invention, it is possible to vary properly the reference value of the engine temperature at which the exhaust gas recirculation is started in accordance with the fuel distillation characteristic of the fuel used, thus preventing driveability from worsening and ensuring a proper reduction of the amount of nitrogen oxide (NOx) included in the exhaust gas. When the heavy type fuel is used, the exhaust gas recirculation is stopped until the engine temperature reaches a level that is higher than that when another type fuel such the light type fuel or the ordinary fuel is used, thereby resulting in a better driveability when compared with the case of the conventional EGR system. And, when the light type fuel is used, the exhaust recirculation is first started when the engine temperature is raised to exceed the level that is preset to a level below the level when another type fuel is used, thereby allowing the exhaust gas recirculation to be fully attributable to reduce properly the amount of nitrogen oxide (NOx) included in the exhaust gas.

Other objects and further features of the present invention will become apparent from the following detailed description when read in conjunction with the accompanying drawings.

BRIEF DESCRIPTION OF THE DRAWINGS

FIG. 4 is a flow chart for explaining the procedure of a fuel distillation sensing subroutine which is incorporated in the microcomputer shown in FIG. 3;

FIG. 5 is a flow chart for explaining the procedure of a main routine which is incorporated in the microcomputer shown in FIG. 3;

FIG. 6 is a diagram showing the relationship between the fuel distillation factor and the engine temperature reference value which is stored in a memory of the microcomputer;

FIG. 7 is a flow chart for explaining the procedure of a subroutine to determine a final indicated valve opening position, which is a part of the main routine shown in FIG. 5;

FIG. 8 is a diagram for explaining a two-dimensional map based on a characteristic chart between the engine speed and the intake manifold pressure, which is used to determine indicated valve opening position;

DESCRIPTION OF THE PREFERRED EMBODIMENT

Figure 1:
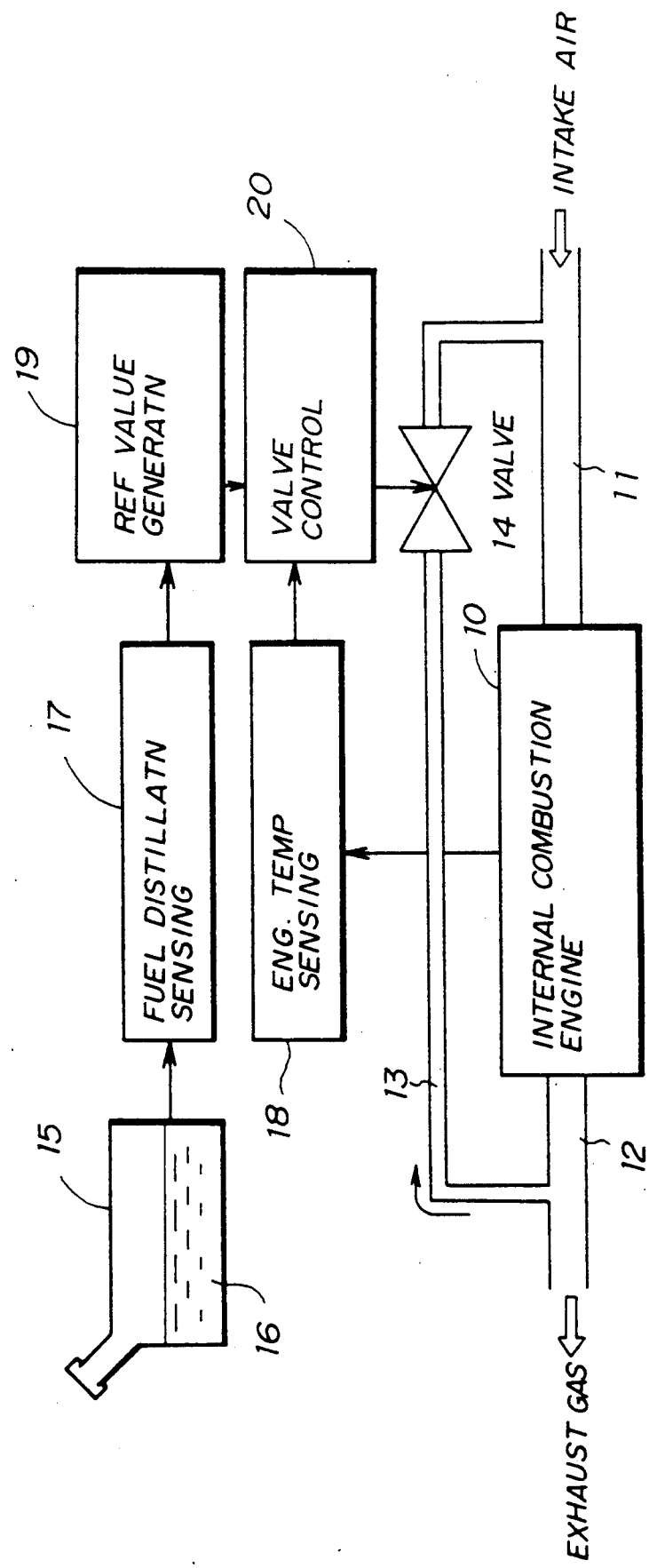
FIG. 1 is a block diagram for explaining an exhaust gas recirculation system according to the present invention.

First, a description will be given of the construction of an exhaust gas recirculation system according to the present invention, with reference to FIG. 1. As shown in FIG. 1, an internal combustion engine 10 takes in air/fuel mixture through an intake passage 11 and sends out exhaust emission from an exhaust passage 12. There is a recirculation passage 13 which connects the exhaust passage 12 to the intake passage 11. The exhaust gas recirculation system according to the present invention generally has a valve 14 provided at an intermediate portion of the recirculation passage 13 connecting the exhaust passage 12 to the intake passage 11, a fuel distillation sensing part 17 for sensing a fuel distillation characteristic of a fuel 16 within a fuel tank 15, an engine temperature sensing part 18 for sensing a temperature of the internal combustion engine 10, a reference value generating part 19, and a valve control part 20. A valve opening position of the valve 14 is adjusted suitably according to an operating condition of the internal combustion engine 10 to control the EGR quantity recirculated to the intake air/fuel mixture. The reference value generating part 19 generates a reference value of engine temperature which is a threshold value at which the valve 14 is turned off to stop the exhaust gas recirculation into the intake air/fuel mixture. Therefore, the reference value of engine temperature determines at which time the exhaust gas recirculation should be stopped in engine operation. And, the valve control part 20 compares the engine temperature supplied from the engine temperature sensing part 18 with the reference value from the reference value generating part 19 to make a decision on whether the fuel used is a heavy type fuel or not. When the engine temperature is not greater than the reference value, the valve 14 is set in a closed position stopping the exhaust gas recirculation. When the engine temperature is greater than the reference value, the valve 14 is controlled to suitably set a valve opening position of the valve 14 allowing the recirculated exhaust gas to flow into the intake manifold in accordance with an operating condition of the internal combustion engine.

Figure 2:
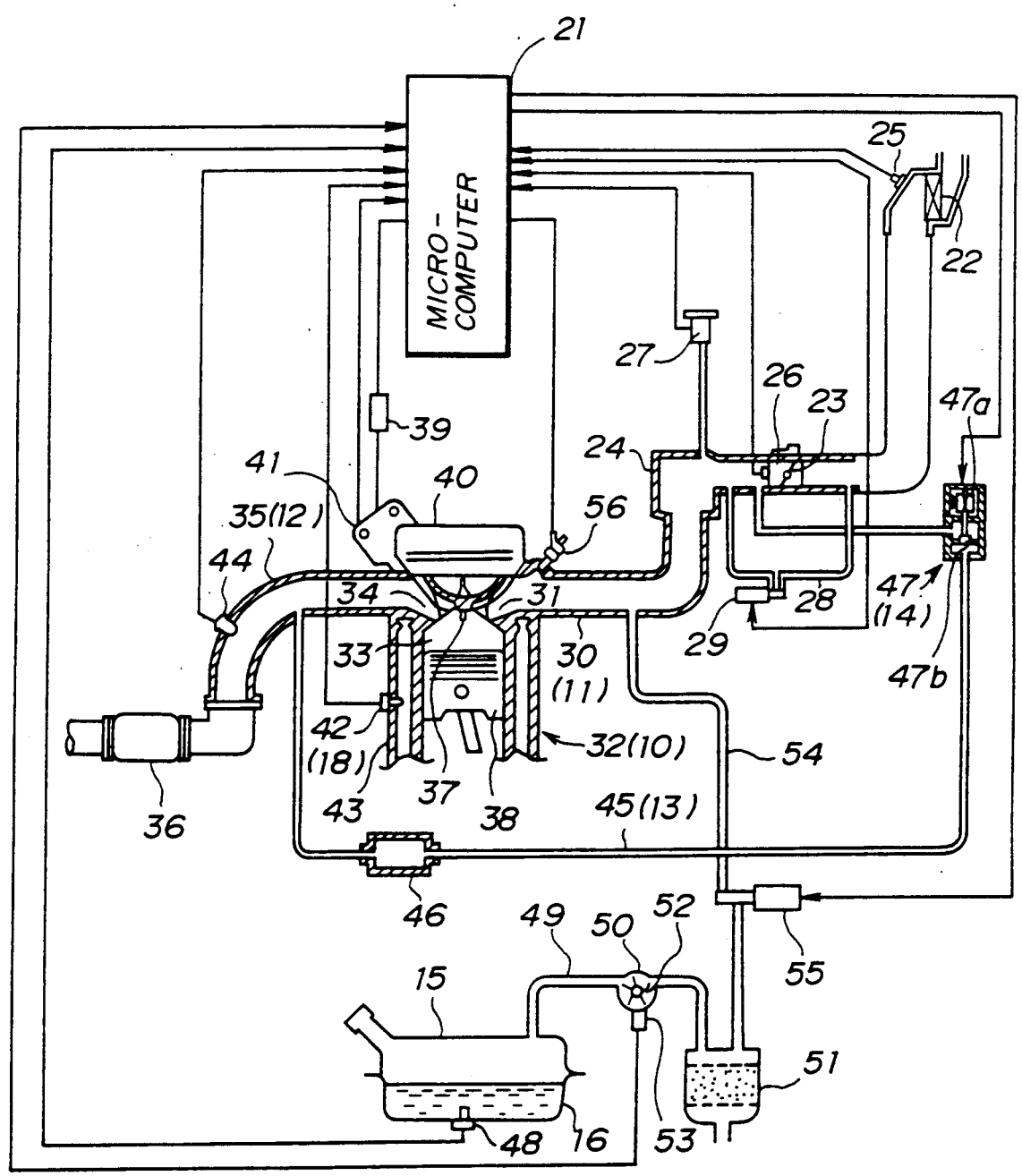
FIG. 2 is a view showing the construction of an embodiment of the exhaust gas recirculation system according to the present invention.

FIG. 2 shows an embodiment of the exhaust gas recirculation system according to the present invention which is applied to a 4-cylinder 4-cycle spark ignition type engine. The operation of this exhaust gas recirculation system is controlled by a microcomputer 21 which will be described later. In FIG. 2, those parts which are the same as those corresponding parts in FIG. 1 are designated by the same reference numerals, and a description thereof will be omitted. As shown in FIG. 2, a surge tank 24 is provided on a downstream side of an air cleaner 22, and a throttle valve 23 is provided in a passage between the air cleaner 22 and the surge tank 24. In the vicinity of the air cleaner 22, an air temperature sensor (ATS) 25 is provided for sensing a temperature of intake air flowing through an inlet passage in which the air cleaner 22 is provided. And, the throttle valve 23 is provided with an idle switch (IDL SW) 26 which is turned on when the throttle valve 23 is set in a closed position. The surge tank 24 is provided with an air pressure sensor (ARS) 27 for sensing a pressure of intake air, and this air pressure sensor 27 may be, for example, a diaphragm type pressure sensor. At a side portion of a passage within which the throttle valve 23 is placed, a bypass passage 28 is provided so that an upstream side of the throttle valve 23 communicates with a downstream side thereof. At an intermediate portion of the bypass passage 28, an idle speed control valve (ISCV) 29 is provided. This idle speed control valve 29 has a valve opening position that is automatically adjusted through control of an electric current across a solenoid within the ISCV 29, allowing an idling engine speed to be adjusted suitably to a target engine speed. In this idle speed control valve 29, a duty factor of an electric current across the solenoid within the ISCV 29 is controlled for obtaining a proper valve opening position of the ISCV 29 so that a flow rate of air passing through the bypass passage 28 is adjusted suitably, thereby setting the idling engine speed to a target engine speed.

The surge tank 24 communicates with a combustion chamber 33 of an engine 32, which corresponds to the internal combustion engine 10 shown in FIG. 1, through an intake manifold 30, corresponding to the intake passage 11 shown in FIG. 1, and further through an intake port 31. A fuel injection valve (FIV) 56 is provided for each of engine cylinders, the fuel injection valve 56 partially projecting inward within the intake manifold 30. By means of the fuel injection valve 56, a fuel 16 from the fuel tank 17 is injected into the intake manifold 30 so that intake air and fuel are mixed together in the vicinity of the intake port 31. And, the combustion chamber 35, corresponding to the exhaust passage 12, communicates with an exhaust manifold 35 via an exhaust port 34, the exhaust manifold 35 leading to a catalytic converter 36. A spark plug 37 is provided on the engine 32, the spark plug 37 partially projecting inward within the combustion chamber 33, and a piston 38 is provided within each of the cylinders of the engine 32, the piston 38 during operation moving up and down. An igniter (IG) 39 generates a high voltage, and this high voltage is supplied to the spark plug 38 for each cylinder of the engine 32 by a distributor 40. A rotation angle sensor (RAS) 41 is provided at the distributor 40 for sensing a rotation angle of a distributor shaft, and this rotation angle sensor 41 supplies an engine speed signal indicative of engine speed to a microcomputer 21 periodically at time intervals of 30 deg. CA. A water temperature sensor (WTS) 42 which constitutes the engine temperature sensing part 18 shown in FIG. 1 is provided at the engine 32 for sensing a temperature of cooling water used for cooling the engine, the water temperature sensor 42 going through a wall of an engine block 45 and partially projecting inward within a water jacket of the engine 32, the water temperature sensor 42 supplies a signal (THW) indicative of a temperature of engine cooling water to the microcomputer 21. Further, an oxygen sensor (OS) 44 is provided at the exhaust manifold 35 for sensing an oxygen concentration of exhaust emission gas from the engine 32 before entering the catalytic converter 36, the oxygen sensor 44 partially projecting inward within the exhaust manifold 35.

The exhaust manifold 35 on an upstream side of the oxygen sensor 44 communicates with the intake manifold 30 on a downstream side of the throttle valve 23 through a recirculation passage 45 which corresponds to the passage 13 shown in FIG. 1. At intermediate portions of the recirculation passage 45, an EGR cooler 46 and an EGR valve (EGRV) 47 corresponding to the valve 14 shown in FIG. 1 are provided, respectively. The EGR cooler 46 is provided for lowering a temperature of recirculated exhaust gas flowing through the recirculation passage 45. The EGRV 47 is turned on and off with a movement of a valve body 47b when a rotor 47a within a stepping motor is rotated, responsive to a valve control signal supplied from the microcomputer 21, to adjust appropriately a valve opening position of the EGRV 47. Therefore, the valve opening position of the EGRV 47 through which the exhaust gas is supplied to the intake manifold 30 is controlled, thereby adjusting suitably the amount of the recirculated exhaust gas flowing into the intake manifold 30.

At a bottom portion of the fuel tank 15, a fuel temperature sensor (FTS) 48 is provided for sensing a temperature of the fuel 16 within the fuel tank 15. From a top portion of the fuel tank 15, a vapor passage 49 is provided so that the fuel tank 15 communicates with a canister 51 through the vapor passage 49. At an intermediate portion of the vapor passage 49, a vapor flowmeter 50 having a rotation part 52 is provided, the rotation part 52 being rotated at a rotation rate proportional to the flow rate of fuel vapor across the vapor flowmeter 50, a signal rotor (not shown) being mounted on the rotation part 52. And, a vapor flow rate sensor 53 is provided on a housing of the vapor flowmeter 50 for supplying an output signal to the microcomputer 21, this output signal changing from a low voltage to a high voltage when the signal rotor of the rotation part 52 in the vapor flowmeter 50 crosses the vapor flow rate sensor 53, and when the signal rotor goes apart from the vapor flow rate sensor 53 the output signal returns back to the low voltage. Therefore, the output signal changes from the low voltage to the high voltage once per revolution of the rotation part 52 of the vapor flowmeter 50. While the flow rate of fuel vapor supplied from the fuel tank 15 is thus sensed by the vapor flowmeter 50, the fuel vapor enters the canister 51. The vapor flow rate sensor 53 and a part of the microcomputer 21 constitutes the fuel distillation sensing part 17 described above.

The canister 51 contains active carbon for adsorbing fuel vapor, and at a bottom portion of the canister 51 an opening is provided. The canister 51 communicates with the intake manifold 30 through a purge passage 54. Fuel vapor adsorbed in the active carbon in the canister 51 enters the intake manifold 30 via the purge passage 54. A vacuum pressure in the intake manifold 30 does not act directly on the fuel tank 15 because an orifice (not shown) is provided at a portion of the purge passage 54. A purge control valve (PCV) 55 is provided at an intermediate portion of the purge passage 54. This purge control valve 55 has a valve opening position that is automatically adjusted by controlling an electric current across a solenoid within the purge control valve 55, thereby allowing the flow rate of fuel vapor through the purge passage 54 to be adjusted properly. In this purge control valve 55, a duty factor of an electric current across the solenoid in the PC 55 from the microcomputer 21 is controlled for obtaining a properly adjusted valve opening position of the PCV 55 so that the flow rate of fuel vapor through the purge passage 54 is appropriately adjusted, thereby setting the flow rate of fuel vapor to a target flow rate. The purge control valve 55 is adjusted to a closed position when the temperature of the engine cooling water is not greater than a predetermined value to, so as to shut off the flow of the fuel vapor into the intake manifold 30. Accordingly, a fuel purging during an unstable operation of the engine 32 is inhibited.

Figure 3:
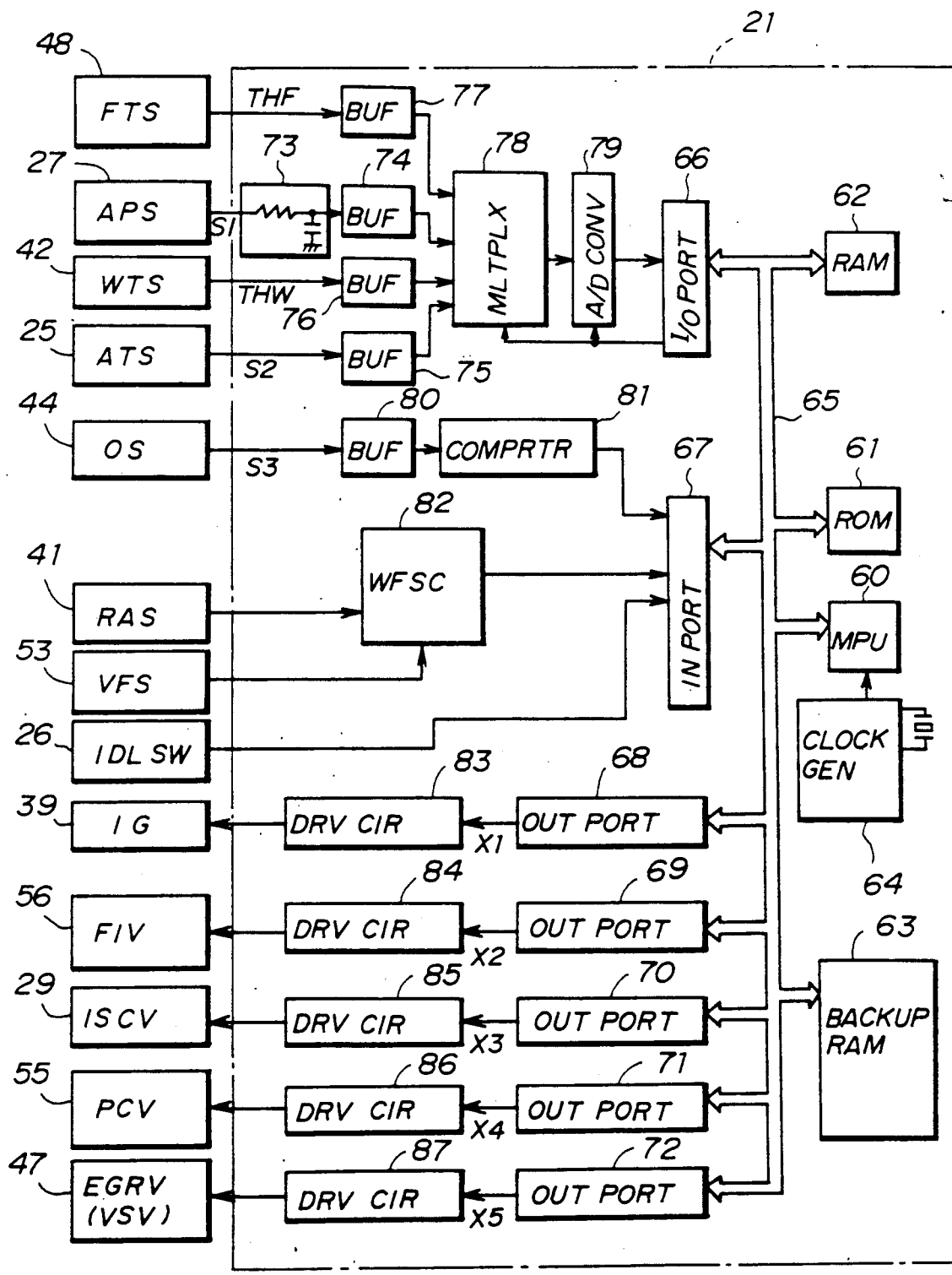
FIG. 3 is a block chart for explaining the construction of a microcomputer shown in FIG. 2.

FIG. 3 is a block diagram for explaining the construction of the microcomputer 21, as shown in FIG. 2, which controls the operation of the exhaust gas recirculation system according to the present invention. In FIG. 3, those parts which are the same as those corresponding parts in FIG. 2 are designated by the same reference numerals, and a description thereof will be omitted. As shown in FIG. 3, the microcomputer 21 generally has a microprocessor unit (MPU) 60, a read only memory (ROM) 61 in which a system processing control software is stored, a random access memory (RAM) 62 for a work area of the system processing control software (BACKUP RAM) 63 in which data items are stored in a nonvolatile manner after the engine operation is stopped, a clock generator (CLK GEN) 64 which supplies a master clock signal to the MPU 60, a bidirectional bus line 65 which is coupled with each of the above described units 60 through 64, an input/output port (I/O PORT) 66, an input port (IN PORT) 67 and output ports (OUT PORTS) 68 through 72. The microcomputer 21 further comprises a filter circuit 73, buffer circuits 74 through 77, a multiplexer 78 to which several analog signals are supplied from the above sensors through the buffer circuits 74 through 77, respectively and an analog-to-digital converter (A/D CONV) 79. An air pressure signal S1 indicative of a measured pressure of intake air is supplied from the air pressure sensor (APS) 27 to the multiplexer 78 through the filter circuit 73 and the buffer circuit 74 which are connected in series. This filter circuit 73 is provided for removing a pulsating component of the air pressure signal S1 supplied from the air pressure sensor 27. An air temperature signal S2 indicative of a measured temperature of intake air is supplied from the air temperature sensor (ATS) 25 to the multiplexer 78 through the buffer circuit 75. A water temperature signal THW indicative of a measured temperature of engine cooling water is supplied from the water temperature sensor (WTS) 42 to the multiplexer 78 through the buffer circuit 76. A fuel temperature signal THF indicative of a measured temperature of fuel within the fuel tank is supplied from the fuel temperature sensor (FTS) 48 to the multiplexer 78 through the buffer circuit 77. Under control of the MPU 60, the multiplexer 78 selectively outputs each of these signals in a prescribed sequence, and each of these signals is converted from a analog signal into a digital signal by the A/D converter 79, then information represented by this digital signal from the A/D converter 79 is stored in the RAM 62 through the I/O port 66. Accordingly, the MPU 60, the multiplexer 78, the A/D converter 79 and the I/O port 66 constitute a sampling part for sampling the signals PM, S2, THF and THW at prescribed time intervals which are supplied from the above described sensors, respectively.

In addition, the microcomputer 21 further comprises a buffer circuit 80, a comparator 81 and a waveform shaping circuit (WFSC) 82. An oxygen signal S3 indicative of an oxygen concentration of the exhaust gas is supplied from the oxygen sensor (OS) 44 to the comparator 81 through the buffer circuit 80. A waveform of the oxygen signal S3 is shaped by the comparator 81, and the resultant signal is supplied to the input port 67. And a waveform of signals supplied from the rotation angle sensor (RAS) 41 and from the vapor flow rate sensor (VFS) 53 is also shaped by the waveform shaping circuit (WFSC) 82, and the resultant signal is supplied to the input port 67. Furthermore, a signal from the idle switch (IDL SW) 26 is supplied to the input port 67 through a buffer circuit (not shown). The microcomputer 21 further includes output ports 68 through 72 and drive circuits 83 through 87. An output signal X1 from the output port 68 is supplied to the igniter (IG) 39 through the drive circuit 83. An output signal X2 from the output port 69 is supplied to the fuel injection valve (FIV) 56 through the drive circuit 84. The drive circuit 84 has a down counter therein. An output signal X3 from the output port 70 is supplied to the idle speed control valve (ISCV) 29 through the drive circuit 85. An output signal X4 from the output port 71 is supplied to the purge control valve (PCV) 55 through the drive circuit 86. An output signal X5 from the output port 72 is supplied to the EGRV 47 through the drive circuit 87 to properly control the valve opening position of the EGRV 47. Hence, the microcomputer 21 having the above described construction with the system processing control softward stored in the ROM 61 controls the above described function of the reference value generating part 19 and the valve control part 20 as shown in FIG. 1.

Next, a description will be given of the operation of the microcomputer 21 to obtain a fuel distillation characteristic of the fuel used, with reference to FIG. 4. FIG. 4 is a flow chart for explaining the operation of a fuel distillation sensing (FDS) subroutine which constitutes a part of the main routine shown in FIG. 5. A step 91 makes a decision on whether a vapor flow measurement time CVA exceeds a reference value Co (e.g., Co=10 seconds). Obviously, it is possible to preset this reference value Co to any suitable value. This vapor flow measurement time CVA is increased by one increment each time a routine (not shown) for a predetermined time period of 4 ms is completed. If the CVA is smaller than the reference value Co, then the FDS routine is completed and returned back to the main routine. If the CVA exceeds the reference value CO, then a step 92 resets the CVA to zero. Thus, the following steps 92 through 97 are performed once per cycle which is determined by the reference value Co. If the reference value Co is present to 10 seconds, these steps 92 through 97 are performed once for every 10 seconds.

The microcomputer 21 comprises a vapor flow rate counter (not shown) which has a value NVA indicative of the flow rate of the fuel vapor, the value being increased by one increment due to occurrence of an external interrupt caused only when an output signal supplied from the vapor flow rate sensor 53 changes from a low level to a high level. In other words, the value NVA is increased by one count each time one revolution of the rotation part 52 of the vapor flowmeter 50 is sensed by the vapor flow rate sensor 53. The step 93 sets the value CVA to a variable NVA10 and the step 94 resets the value CVA to zero. Accordingly, the variable NVA10 has a value indicating the number of revaluation of the rotation part 52 of the vapor flowmeter 50 per unit time, this unit time being represented by the reference value Co (e.g., 10 seconds).

Next, the step 95 obtains the value of a fuel temperature correction factor KVA based on the fuel temperature signal THF indicative of a temperature of the fuel 16 within the fuel tank 15 which is supplied from the fuel temperature sensor 48. Generally, the fuel having the same fuel distillation characteristic shows a greater amount of fuel vapor at a high fuel temperature than at a low fuel temperature. Therefore, in order to correct a difference in the amount of fuel vapor due to a difference in fuel temperature, the fuel temperature correction factor KVA is defined such that the higher the fuel temperature is the smaller the value of the KVA is. The step 96 performs an arithmetic multiplication operation which is represented by a formula NVA10×KVA, to determine the amount of fuel evaporation per unit time, which is set to a variable NVA10T. Thus, the NVA10T shows the measured quantity of fuel vapor per unit time NVA10 which is corrected by the fuel temperature correction factor KVA. Finally, the step 97 determines the fuel distillation factor KF based on the value of the NVA10T. In the present embodiment, the vapor flow measurement time of 10 seconds is used, and it is possible to make a change of fuel distillation factor during engine operation available to the microcomputer 21.

Next, a description will be given of the operation of the microcomputer 21 to control the reference value generating part 19 and the valve control part 20, with reference to FIG. 5. FIG. 5 is a flow chart for explaining the procedure of the main routine. A step 101 allows the MPU 60 to read out an idle switch signal LL, an intake manifold pressure signal PM, an engine speed signal NE, a water temperature signal THW and a fuel distillation factor KF from the RAM 62. The idle switch signal LL is supplied from the idle switch 26 and is indicative of a state of the idle switch 26 when being turned ON. The intake mainfold pressure signal PM is determined based on the air pressure signal S1 supplied from the air pressure sensor 27, and is indicative of a pressure of intake air in the intake manifold. The engine speed signal NE is obtained from an output signal supplied from the rotation angle sensor 41, and is indicative of an engine speed of the engine 32. The water temperature signal THW indicative of an engine coolant temperature is supplied from the water temperature sensor 42. And, the fuel distillation factor KF is calculated through the FDS routine shown in FIG. 4, as described above.

A step 102 reads out a reference value THWO by making reference to a two-dimensional map stored in the ROM 61, which is predetermined based on a relationship between the fuel distillation factor KF and the reference value THWO which is represented by a characteristic chart as shown in FIG. 6. The reference value THWO is thus determined depending on the fuel distillation factor KF calculated. As shown in FIG. 6, when the fuel distillation factor KF is relatively small, the fuel within the fuel tank is a heavy type fuel and the value of the reference value THWO becomes relatively high. And, when the fuel distillation factor KF is relatively great, the fuel is a light type fuel and the value of the reference value THWO becomes relatively low. Next, a step 103 makes a decision on whether or not the water temperature THW from the water temperature sensor 42 obtained in the step 101 is greater than the reference value THWO determined ion the step 102. If the THW is greater than the THWO, then a step 104 makes a decision on whether the value indicated by the signal LL is equal to zero ("0"). If the value indicated by the signal LL is equal to zero the idle switch 26 is turned off and a step 105 is taken to perform a subroutine procedure to determine the final indicated valve opening position TSTEP1 which will be described below. On the other hand, in the step 103, if the THW is found to be smaller than or equal to the reference value THWO (THW≦THWO), then a step 106 is taken to reset the TSTEP1 to zero. After the TSTEP1 is determined either in the step 105 or in the step 106, a step 107 is taken to perform a subroutine procedure to control the operation of the EGRV 47. Then, the main routine as shown in FIG. 5 is completed.

Next, the procedure of a subroutine to determine the final indicated valve opening position TSTEP1 of the EGRV 47 which corresponds to the step 105 as shown in FIG. 5 will now be described. There are two different methods that can be used to determine the TSTEP1, one method is to obtain the value of TSTEP1 by taking into consideration a flow rate of recirculated exhaust gas (called, hereinafter, the EGR rate) and the other is to obtain the TSTEP1 by taking into consideration an active region of exhaust gas recirculation (called, hereinafter, the EGR active region). The operating condition of the internal combustion engine generally is represented by an engine speed and an intake manifold pressure at that engine speed of the internal combustion engine.

FIG. 7 is a flow chart for explaining the procedure of a subroutine to determine the final indicated valve opening position TSTEP1 based on the flow rate of recirculated exhaust gas, or the EGR rate described above. After the procedure of this subroutine is ended, control is returned back to the main routine as shown in FIG. 5. A step 201 in this subroutine allows the MPU 60 to read out an indicated valve opening position TSTEP from the RAM 62, then the MPU 60 stores the indicated valve opening position TSTEP in a register within the MPU 60. The indicated valve opening position TSTEP is a numerical value which is obtained by making reference to a two-dimensional map being previously stored in the ROM 61, which indicated the numerical value of the TSTEP determined based on a correlation between an engine speed NE and an intake manifold pressure PM at that engine speed as shown in FIG. 8. For example, the value of the TSTEP at an operating condition of the internal combustion engine in which the engine speed is at NE1 and the intake manifold pressure at that engine speed is at PE1 is determined to be 40, as indicated in FIG. 8. This two-dimensional map is previously stored in the ROM 61 shown in FIG. 3, and the thus determined indicated valve opening position TSTEP is stored in the RAM 62. An intermediate value between two numerical values in two different cells which is not determined indicated in the two-dimensional map in FIG. 8 is calculated through an interpolation method.

Figure 9B:
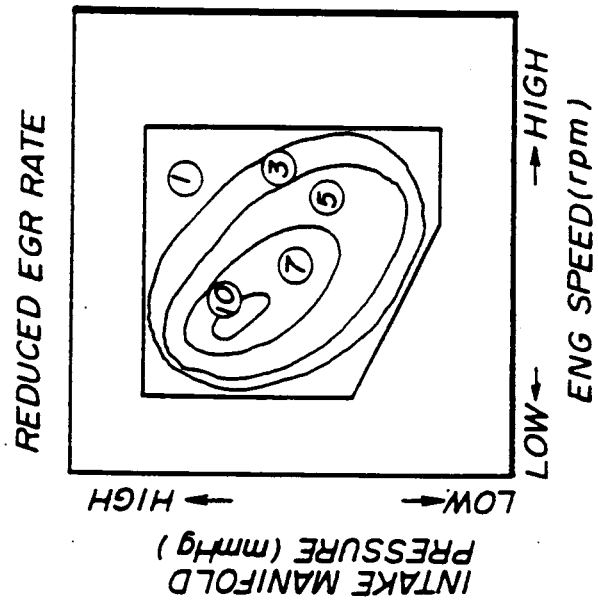
FIG. 9A and B are diagrams for explaining the procedure to correct the indicated valve opening position within the subroutine shown in FIG. 7.
Figure 9A:
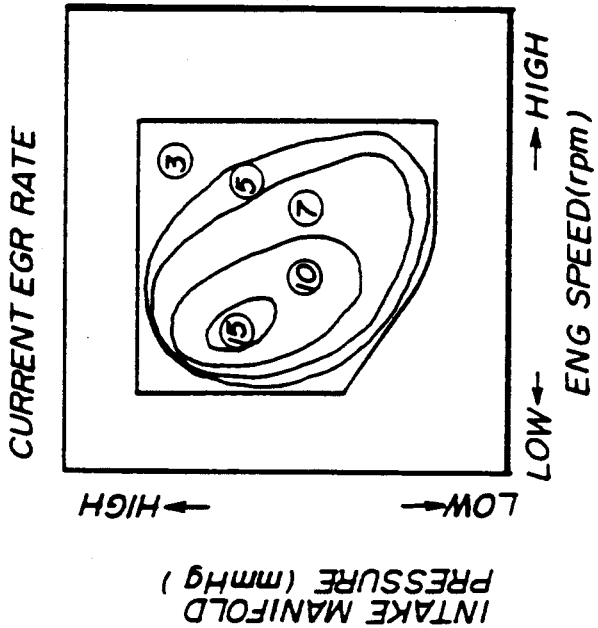

A step 202 in the subroutine shown in FIG. 7 allows the MPU 60 to read out the fuel distillation factor KF being stored in the RAM 62, which is determined through the fuel distillation sensing (FDS) subroutine as shown in FIG. 4. A step 203 compares the fuel distillation factor KF with the reference value KFO to make a decision on whether the fuel used is a heavy type fuel or a light type fuel. If the fuel distillation factor KF is determined to be greater than the reference value KFO (or, the fuel used is not a heavy type fuel), then a step 204 is taken to a reset a correction value TSTEPKF with respect to the indicated valve opening position TSTEP to zero. In this case, a correction of the indicated valve opening position is not made and the final indicated valve opening position TSTEP1 is equal to the TSTEP. IF the fuel distillation factor KF is determined to be smaller than the reference value KFO (or, the fuel used is a heavy type fuel), then a step 206 is taken to determine the correction value TSTEPKF. This correction value TSTEPKF is calculated based on a two-dimensional map as shown in FIGS. 9A and 9B. This two-dimensional map as shown in FIGS. 9A and 9B is provided when the correction value TSTEPKF is determined so as to modify the current EGR rate based on the current correlation between the engine speed NE and the intake manifold pressure PM to which the current EGR rate of the internal combustion engine as shown in FIG. 9A is applied, to a reduced EGR rate based on a new correlation therebetween to which reduced EGR rates as shown in FIG. 9B are applied. In FIGS. 9A and 9B, a numerical value within a circule represents an EGR rate expressed in percent with respect to an operating condition of the internal combustion engine, the engine speed NE of the internal combustion engine being supplied from the rotating angle sensor (RAS) 41 to the RAM 62 within the microcomputer 21, the intake manifold pressure PM being supplied from the air pressure sensor (APS) 27 to the RAM 62. The reduced EGR rate is determined based on the two-dimensional map charts shown in FIGS. 9A and 9B, the EGR rate corresponding to the engine speed NE and the intake manifold pressure PM at that engine speed NE as indicated in FIGS. 9A and 9B.

After either the step 204 for the step 206 is performed, a step 205 allows the MPU 60 to determine a final EGR rate with the final indicated valve opening position TSTEP1 of the EGRV 47. This final indicated valve opening position TSTEP1 is calculated by subtracting the correction value TSTEPKF obtained in the step 204 or 206 from the indicated valve opening position TSTEP obtained in EGRV 47 is determined with the calculated final indicated valve opening position TSTEP1 with respect to the EGRV 47.

Figure 10:
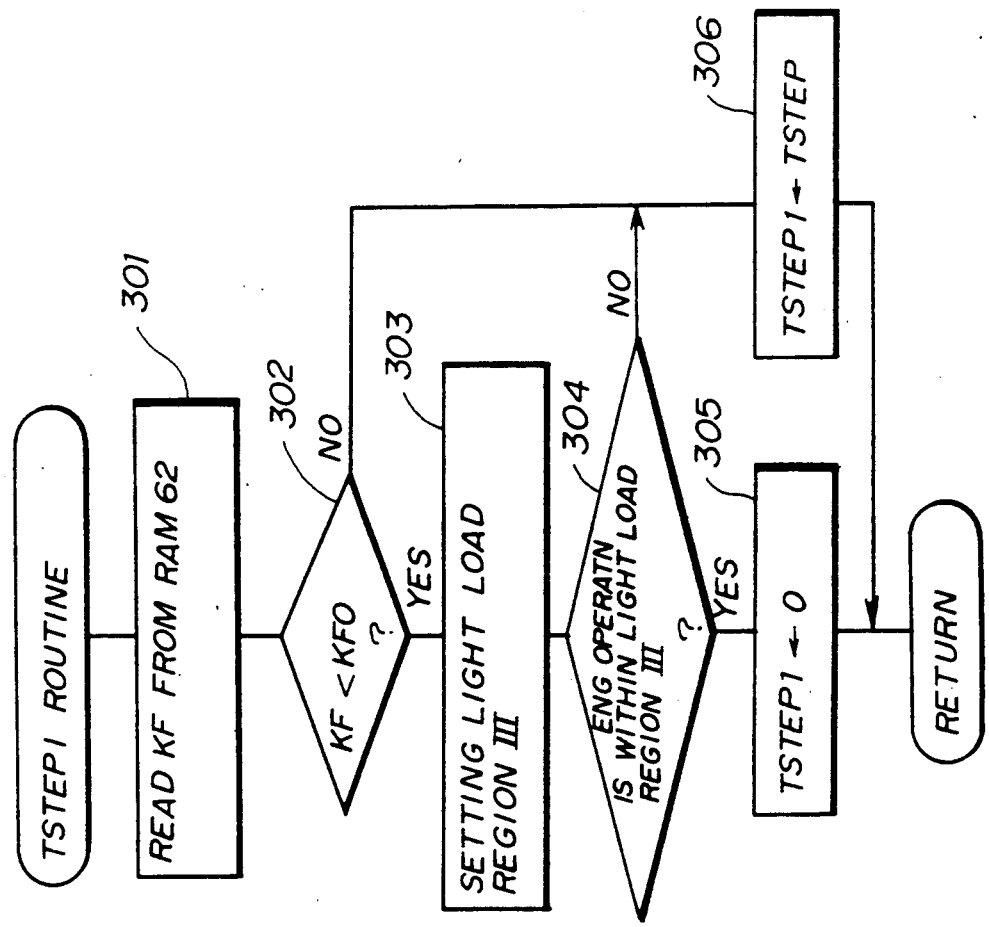
FIG. 10 is a flow chart for explaining the procedure of another subroutine to determine a final indicated valve opening position, which is a part of the main routine shown in FIG. 5.
Figure 11A:
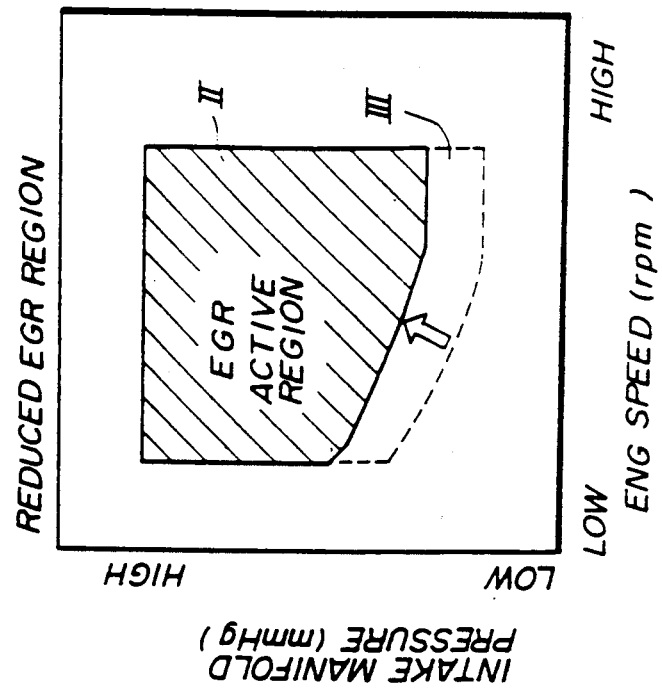
FIG. 11A and B are diagrams for explaining the procedure to correct the indicated valve opening position within the subroutine shown in FIG. 10.
Figure 11B:
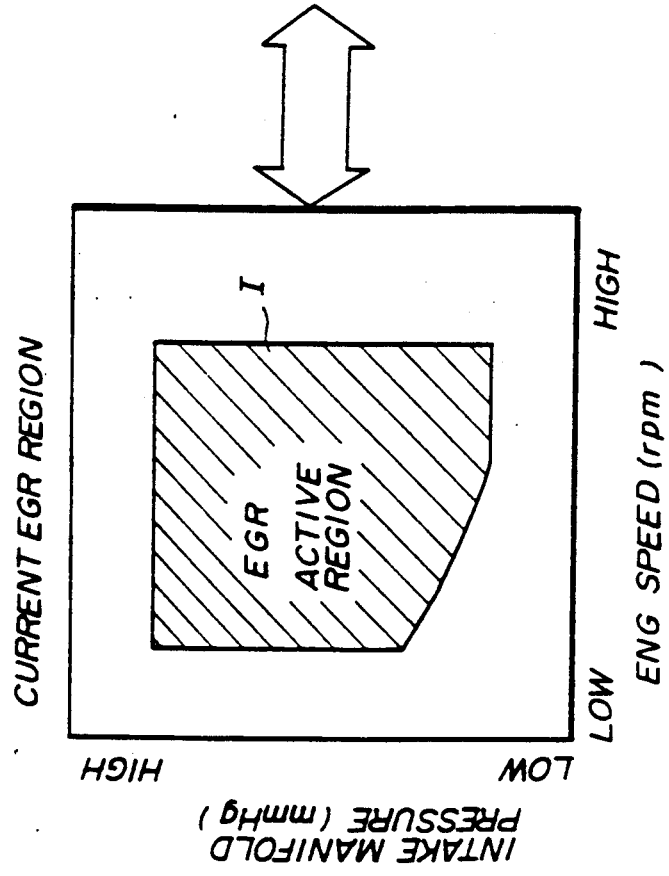

FIG. 10 is a flow chart for explaining the procedure of the other subroutine to determine a final indicated valve opening position of the EGRV 47 based on a reduced EGR active region, which corresponds to the step 105 in the main routine as shown in FIG. 5. A step 301 allows the MPU 60 to read out a fuel distillation factor KF which is previously stored in the RAM 62. A step 302 compares the fuel distillation factor KF with a reference value KFO to make a decision on whether the fuel used is a heavy type fuel or a light type fuel. If the fuel distillation factor KF is lower than the reference value KFO (or, the fuel used is a heavy type fuel), then a step 303 makes a setting of a reduced active region of the exhaust gas recirculation. This setting of the reduced active region II of the EGR, as indicated in FIG. 11B, is made through reduction of a light load region III, indicated by a dotted line in FIG. 11B, from the current active region of the EGR, as indicated in FIG. 11A, which is expressed based on a characteristic chart describing a relationship between the engine speed NE and the intake manifold pressure PM. The current EGR active region is used in a conventional EGR system or when a light type fuel is used. According to the present invention, the reduced EGR active region is obtained in the step 303, and, based on the reduced EGR active region, the final indicated valve opening position TSTEP1 is determined especially when the heavy type fuel is used.

When the internal combustion engine operates within the light load region III as shown in FIG. 11B, the quantity of fuel being supplied to the engine combustion chamber is relatively small, Therefore, when more than a prescribed amount of fuel sticks to the inside wall of the intake port of the internal combustion engine, there may often be a relatively small air/fuel mixture in the engine combustion chamber (fuel included in air/fuel mixture is lean), causing an undesired misfire to occur during engine operation. The step 303 determines the light load region III in which such a misfire occurs appreciably rather than a reduction of the amount of nitrogen oxide (NOx) in the exhaust gas by the exhaust gas recirculation. Conventionally, the light load region III i a part of the current EGR active region, but according to the present invention, the light load region III in which a misfire is very likely to occur is excluded from the EGR active region in which the exhaust gas recirculation is actually performed, as indicated by the reduced EGR active region II, thereby preventing occurrence of a misfire during engine operation.

A step 304 makes a decision on whether the current operating condition of the internal combustion engine is within the light load region III which is determined in the step 303, by making reference to the engine speed NE and the intake manifold pressure PM indicated in the two-dimensional map shown in FIG. 8. The engine speed NE and the intake manifold pressure PM when the internal combustion engine currently operates are obtained by the RAS 41 and the APS 27, as shown in FIG. 2, and stored in the RAM 62, as shown in FIG. 3. IF the engine operation is within a region of the two-dimensional map shown in FIG. 8 corresponding to the light load region III obtained in the step 303, then a step 305 sets zero to the final indicated valve opening position TSTEP1 of the EGRV 47 that makes the EGRV 74 be placed at a closed position, thereby stopping the exhaust gas recirculation to the intake manifold.

In the meantime, in the step 302 above, if the fuel distillation factor KF is found to be higher than the reference value KFO, the fuel used is not the heavy type fuel. Or, in the step 304 above, if the current operating condition of the internal combustion engine is not within a region indicated by the light load region III in FIG. 11B, then a step 306 sets the value of the TSTEP1 to the TSTEP. After either the step 305 or the step 306 is completed, the procedure of this subroutine shown in FIG. 10 is completed. According to the present embodiment, it is possible to prevent occurrence of a misfire within the combustion chamber, because the valve opening position of the EGRV 47 when the heavy type fuel is used is determined through correction of the EGR active region to make the current EGR active region narrower than that when the light type fuel is used. The exhaust gas recirculation is stopped when the current operating condition of the internal combustion engine is within the light load region III shown in FIG. 11B, in which a misfire is very likely to take place. Further, when the light type fuel which inherently does not cause so great change of air/fuel ratio in the combustion chamber is currently used, the exhaust gas recirculation is allowed in a manner similar to the case of the conventional EGR system, so as to make the internal combustion engine operate within the current EGR active region I as indicate in FIG. 11A. Therefore, the amount of nitrogen oxide (NOx) included in the exhaust gas can be reduced without causing a poor driveability.

Figure 12:
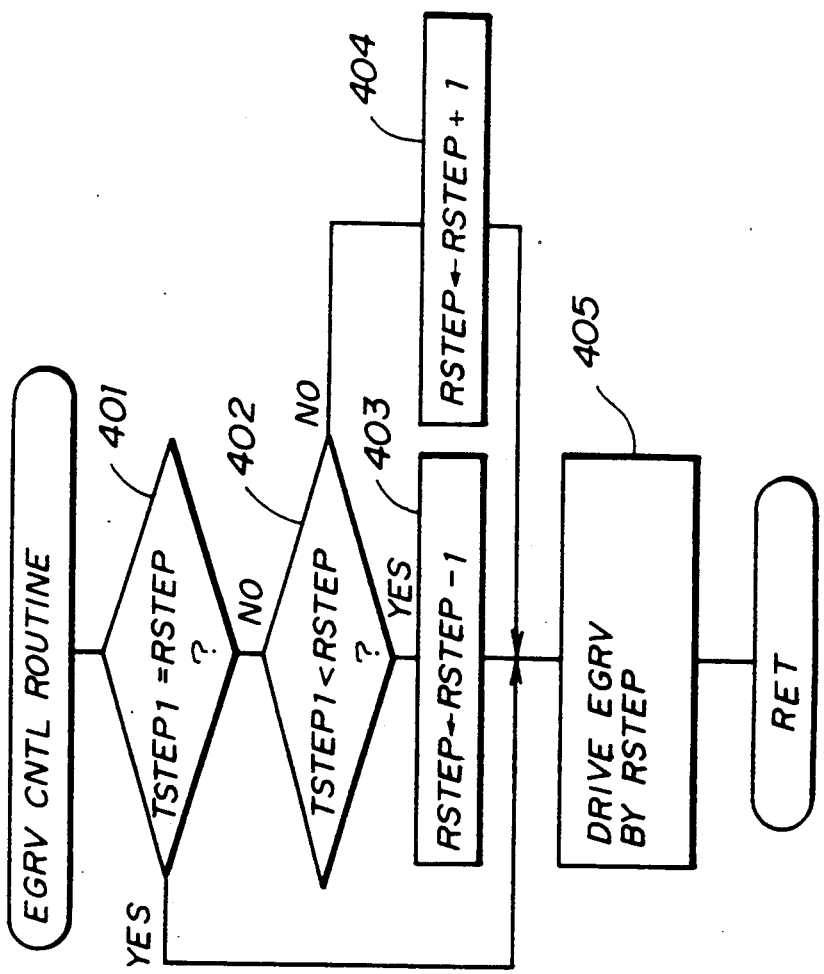
FIG. 12 is a flow chart for explaining the procedure of another subroutine to control suitably the exhaust gas recirculation valve, which is a part of the main routine shown in FIG. 5.

Next, a description will be given of the procedure of an EGRV control subroutine which corresponds to the step 107 in the main routine shown in FIG. 5. FIG. 12 is a flow chart for explaining the procedure of the EGRV control subroutine. A step 401 makes a decision on whether the final indication valve opening position TSTEP1, obtained in the step 205 in FIG. 7 or in the step 305 or 306 in FIG. 10, is equal to the variable RSTEP corresponding to the actual valve opening position of the EGRV 47. If the TSTEP1 is not equal to the RSTEP, then a step 402 makes a decision on whether or not the TSTEP1 is smaller than the RSTEP. If the TSTEP1 is smaller than the RSTEP (TSTEP-1<RSTEP), then a step 403 subtracts one from the current value of RSTEP. On the other hand, if the TSTEP1 is greater than the RSTEP (TSTEP1<RSTEP), then a step 404 adds one to the current value of RSTEP. Then, a step 405 supplies the resultant value of the variable RSTEP to the EGRV 47 through the output port 72 and the drive circuit 87, thus the EGRV 47 being driven suitably in accordance with the operating condition of the internal combustion engine.

In the meantime, if the TSTEP1 is found to be equal to the RSTEP in the step 401, then the step 405 is next taken so that eh EGRV 47 is driven depending on the current value of the variable RSTEP. The procedure of the EGRV control subroutine as indicated in FIG. 12 is completed and control is returned back to the main routine as shown in FIG. 5. Therefore, according to the EGRV control subroutine shown in FIG. 12, it is possible to adjust appropriately the valve opening position of the EGRV 47 to change the valve opening position of the EGR 47 by one decrement in a direction to close the EGRV 47 when the current value of the variable RSTEP indicative of the actual valve opening position of the EGRV 47 is greater than the value of the TSTEP1, when the current value of the variable RSTEP is smaller than the TSTEP1 the valve opening position of the EGRV 47 is changed by one increment in a direction to open the EGRV 47 wider, and when the RSTEP is equal to the TSTEP1, the current valve opening position of the EGRV 47 remains unchanged.

According to this embodiment, when the temperature THW of engine cooling water is higher than the predetermined reference value THWO, it is possible to prevent occurrence of a misfire of the internal combustion engine, which is caused frequently when the heavy type fuel is used with the internal combustion engine. The exhaust gas recirculation is performed when the heavy type fuel is used, such that the EGR quantity is reduced to a level that is lower than the EGR quantity when the light type fuel or the ordinary fuel, other than the heavy type fuel, is used (as in the flow chart shown in FIG. 7). Or, the exhaust gas recirculation with the heavy type fuel being used may be performed to prevent a misfire of the internal combustion engine from being caused, such that the active region of the EGR in the engine speed vs. intake manifold pressure characteristic chart, as shown in FIGS. 11A and 11B, is changed to a new reduced active region that is narrower than the current active region of the EGR. Also, when the heavy type fuel is used and the temperature THW of engine cooling water is not higher than the reference value THW0, it is possible to stop the exhaust gas recirculation described above. In such a case, the reference value THW0 is, as described above, preset to a level higher than the reference value when the light type fuel or the ordinary fuel is used, and therefore the exhaust gas recirculation is stopped immediately after the temperature THW of engine cooling water exceeds such a higher level of the reference value THW0, thereby preventing a poor driveability from being caused.

In the meantime, when the light type fuel is used, the reference value THW0 is preset to a level lower than the reference value when the heavy type fuel or the ordinary fuel is used. The exhaust gas recirculation is not started until the temperature THW of engine cooling water reaches such a relatively low level when compared with the preset level of the reference value when the heavy type fuel is used. It is therefore possible to start the exhaust gas recirculation at a relatively early time of engine operation, thereby allowing an effective reduction of the amount of nitrogen oxide (NOx) in the exhaust gas.

Further, the present invention is not limited to the above described embodiments, and modifications and variations may be made without departing from the scope of the present invention. For example, the fuel distillation sensing part 17, which is used in the exhaust gas recirculation system of the present invention, may be any of several conventional apparatus. Among such conventional apparatus, there is a sensing apparatus which obtains a fuel distillation data by making use of a response speed change responsive to the change of fuel condition when an engine operating condition changes, as disclosed in Japanese Laid-Open Patent Application No. 63-66436. Also, among such conventional apparatus which may be used as the fuel distillation sensing part 17, there are several apparatus including a sensing apparatus which obtains a fuel distillation data based on a change of fuel temperature from before air and fuel are mixed together to that after the air/fuel mixture is obtained, as disclosed in Japanese Laid-Open Utility Model Application Nos. 62-59740 and 62-59742, a sensing apparatus which senses a specific gravity of fuel as disclosed in Japanese Laid-Open Patent Application No. 62-147036, a sensing apparatus which obtains a fuel distillation data from a reid vapor pressure (RVP) determined by a rise time for which a fuel temperature and fuel tank pressure increase and reach prescribed reference values, respectively, as disclosed in Japanese Laid-Open Utility Model Application No. 62-116144, and a conventional pressure sensing apparatus which senses a pressure within a fuel tank.

In addition, the valve 14 provided at an intermediate portion of the recirculation passage according to the present invention is not limited to the EGRV 47 which is shown in FIG. 2, but it is possible to use a vacuum switching valve (VSV) provided together with an exhaust gas recirculation (EGR) valve, the vacuum switching valve being controlled by the microcomputer 21 to turn the EGR valve ON when a vacuum pressure from an intake manifold is applied to the EGR valve. Further, it is possible to use the correction procedures as described above with reference to FIGS. 9 and 11, in addition to the use of the modified embodiment described above.

What is claimed is:

1. An exhaust gas recirculation system comprising:
   a recirculation passage provided between an exhaust passage of an internal combustion engine and an intake passage thereof;
   a valve provided at an intermediate portion of the recirculation passage for regulating a flow of an exhaust gas from the exhaust passage to the intake passage through the recirculation passage;
   engine temperature means for sensing an engine temperature of the internal combustion engine;
   fuel distillation means for sensing a fuel distillation characteristic of a fuel within a fuel tank;
   first valve control means, responsive to a first signal indicative of the fuel distillation characteristic supplied from the fuel distillation means, for generating a reference value of the engine temperature at which the valve is turned ON allowing the exhaust gas to recirculated through the recirculation passage to the intake passage, said reference value being varied to a first level when the fuel within the fuel tank shows a relatively low fuel distillation characteristic and said reference value being varied to a second level when the fuel within the fuel tank shows a relatively high fuel distillation characteristic, the first level of the reference value being higher than the second level; and
   second valve control means for comparing the engine temperature from the engine temperature means with the reference value from the first valve control means, ans, so that the valve is placed at a closed position stopping the flow of the exhaust gas through the recirculation passage to the intake passage when the engine temperature is not higher than the reference value, and after the engine temperature is raised to exceed the reference value the valve is placed at an open position allowing the exhaust gas to be recirculated through the recirculation passage to the intake passage.

2. The exhaust gas recirculation system as claimed in claim 1, wherein a fuel vapor flowmeter and a fuel vapor sensor constitute the fuel distillation means and a part of microcomputer constitutes the first valve control means, the fuel vapor flowmeter provided in a passage between the fuel tank and a canister for measuring a flow rate of fuel vapor from the fuel tank to the canister through said passage, the fuel vapor sensor provided on the fuel vapor flowmeter, said part of the microcomputer varying the reference value to a level that is determined depending on the fuel distillation characteristic indicated by the first signal supplied from the fuel vapor sensor to the microcomputer, said reference value which is varied to the thus determined level being supplied to the second valve control means, the fuel distillation characteristic being determined from a quantity of the fuel vapor flowing through the fuel vapor flowmeter per unit time which is measured by the fuel vapor flowmeter.

3. The exhaust gas recirculation system as claimed in claim 2, wherein the microcomputer comprises a vapor flow counter having a count value indicative of the flow rate of the fuel vapor flowing from the fuel tank to the canister, said count value being increased by one increment each time an output signal from the fuel vapor sensor to the microcomputer changes from a low level to a high level, the vapor flow counter serving to count the count value for a prescribed period of unit time, the prescribed period of unit time being changeable to an arbitrary value.

4. The exhaust gas recirculation system as claimed in claim 1, wherein the fuel within the fuel tank is classified into a number of fuel types including a heavy type fuel, depending on a fuel distillation factor which is determined with the first signal supplied from the fuel distillation means to a microcomputer, said fuel distillation factor being compared with a reference value, the fuel within the fuel tank being determined to be the heavy type fuel when the fuel distillation factor is lower than said reference value.

5. The exhaust gas recirculation system as claimed in claim 1, wherein a final valve opening position of the valve is calculated by reducing a correction value from an indicated valve opening position, the indicated valve opening position being predetermined based on a characteristic chart describing a corresponding value of the indicated valve opening position in a relationship between an engine temperature and an intake manifold pressure, said indicated valve opening position being stored in a memory within a microcomputer, the correction value being determined, only when it is determined that the fuel is a heavy type fuel, through a decrease of a prescribed quantity of a flow rate of exhaust gas from the current flow rate of recirculated exhaust gas which is predetermined based on the engine speed and the intake manifold pressure in accordance with the current operating condition of the internal combustion engine.

6. The exhaust gas recirculation system as claimed in claim 5, wherein said correction value for calculating the final valve opening position of the valve is set to zero when it is determined that the fuel within the fuel tank is not a heavy type fuel, the final valve opening position of the valve thus being equal to the indicated valve opening position stored in the memory within the microcomputer corresponding to the engine speed and the intake manifold pressure.

7. The exhaust gas recirculation system as claimed in claim 1, wherein a final valve opening position of the valve is calculated from an indicated valve opening position, the indicated valve opening position being predetermined based on a characteristic chart describing a corresponding value of the indicated valve opening position in a relationship between an engine temperature and an intake manifold pressure, said indicated valve opening position being stored in a memory within a microcomputer, a light load region in which the internal combustion engine operates at a relatively low engine speed and at a relatively low intake manifold pressure being determined within the characteristic chart only when it is determined that the fuel is a heavy type fuel, a new reduced active region of exhaust gas recirculation within the characteristic chart being determined by reducing said light load region from a current active region of exhaust gas recirculation, the final valve opening position being set to the indicated valve opening position only when the internal combustion engine currently operates within said new reduced active region.

8. The exhaust gas recirculation system as claimed in claim 7, wherein the final valve opening position of the valve is set to zero, when it is determined that the fuel is not a heavy type fuel, or when the internal combustion engine currently operates in the light load region determined within the characteristic chart, thereby placing the valve at a closed position stopping the exhaust gas recirculation.

* * * * *

UNITED STATES PATENT AND TRADEMARK OFFICE
CERTIFICATE OF CORRECTION

PATENT NO. : 5,054,460

DATED : October 8, 1991

INVENTOR(S) : Tamotu Ogita

It is certified that error appears in the above-identified patent and that said Letters Patent is hereby corrected as shown below:

Column 3, line 54, after "such" insert --as--.
Column 4, line 28, after "determine" insert --an--.
Column 7, line 29, change "PC" to --PCV--.
Column 7, line 37, after "value" change "to" to --to--.
Column 8, line 18, after "from" change "a" to --an--.
Column 9, line 9, change "CO" to --Co--.
Column 9, line 13, change "present" to --preset--.
Column 9, lines 27-28 change "revaluation" to --revolutions--.
Column 9, line 44 change "NVAlO" to --NVA10--.
Column 10, line 27, change "ion" to --in--.
Column 11, line 3, change "indicated" to --indicates--.
Column 11, line 62, change "for" to --or--.
Column 12 line 1, before "EGRV" insert --the step 201. As the result, the final EGR rate of the --.
Column 12, line 47 change "III i a" to --III is a--.
Column 13, line 1, change "74" to --47--.
Column 13, line 47, change " )R-" to --)R- - -.
Column 13, line 56, change "eh" to --the--.
Column 15, line 3, change "reid vapor pressure" to --Reid Vapor Pressure--.
Column 15, line 17, change "ON" to --ON--.
Column 15, line 41, before "recirculated" insert --be--.

UNITED STATES PATENT AND TRADEMARK OFFICE
CERTIFICATE OF CORRECTION

PATENT NO. : 5,054,460
DATED : October 8, 1991
INVENTOR(S) : Tamotu Ogita It is certified that error appears in the above-identified patent and that said Letters Patent is hereby corrected as shown below:

Column 15, line 53, delete "ans,".

Signed and Sealed this

Fourth Day of May, 1993

*Attest:*

MICHAEL K. KIRK

*Attesting Officer*  Acting Commissioner of Patents and Trademarks